(12) United States Patent
Van Der Krieken

(10) Patent No.: US 12,484,583 B2
(45) Date of Patent: *Dec. 2, 2025

(54) ANTIFUNGAL COMPOSITION COMPRISING NATAMYCIN AND AT LEAST ONE INSECTICIDE

(71) Applicant: Ceradis Patent B.V., Wageningen (NL)

(72) Inventor: Wilhelmus Maria Van Der Krieken, Wageningen (NL)

(73) Assignee: Ceradis Patent B.V., Wageningen (NL)

( * ) Notice: Subject to any disclaimer, the term of this patent is extended or adjusted under 35 U.S.C. 154(b) by 879 days.

This patent is subject to a terminal disclaimer.

(21) Appl. No.: 17/630,313

(22) PCT Filed: Aug. 13, 2020

(86) PCT No.: PCT/NL2020/050511
§ 371 (c)(1),
(2) Date: Jan. 26, 2022

(87) PCT Pub. No.: WO2021/029770
PCT Pub. Date: Feb. 18, 2021

(65) Prior Publication Data
US 2022/0256856 A1    Aug. 18, 2022

(30) Foreign Application Priority Data
Aug. 13, 2019  (EP) .................................. 19191549

(51) Int. Cl.
| | | |
|---|---|---|
| A01N 43/90 | (2006.01) | |
| A01N 25/10 | (2006.01) | |
| A01N 43/40 | (2006.01) | |
| A01N 43/50 | (2006.01) | |
| A01N 43/56 | (2006.01) | |
| A01N 43/78 | (2006.01) | |
| A01N 43/88 | (2006.01) | |
| A01N 53/00 | (2006.01) | |
| A01P 3/00 | (2006.01) | |

(52) U.S. Cl.
CPC ............ *A01N 43/90* (2013.01); *A01N 25/10* (2013.01); *A01N 43/40* (2013.01); *A01N 43/50* (2013.01); *A01N 43/56* (2013.01); *A01N 43/78* (2013.01); *A01N 43/88* (2013.01); *A01N 53/00* (2013.01); *A01P 3/00* (2021.08)

(58) Field of Classification Search
None
See application file for complete search history.

(56) References Cited

U.S. PATENT DOCUMENTS

2015/0038442 A1 * 2/2015 van der Krieken .... A01N 41/04
514/31

FOREIGN PATENT DOCUMENTS

| CN | 101716183 A | * | 6/2010 | .......... A61K 36/481 |
|---|---|---|---|---|
| CN | 105950011 A | | 9/2016 | |
| CN | 106190438 A | | 12/2016 | |
| CN | 105109231 B | | 1/2017 | |
| CN | 107163707 A | | 9/2017 | |
| JP | 62205001 A | | 9/1987 | |
| JP | 2015509530 A | | 3/2015 | |
| WO | 2012107466 A1 | | 8/2012 | |
| WO | 2012117051 A1 | | 9/2012 | |
| WO | 2012117058 A1 | | 9/2012 | |
| WO | 2017043972 A1 | | 3/2017 | |

OTHER PUBLICATIONS

Perumalsamy et al., "Larvicidal activity and possible mode of action of four flavonoids and two fatty acids identified in Millettia pinnata seed toward three mosquito species", Parasites & Vectors, vol. 8, No. 1 (2015), Article No. 237, pp. 1-14.
"L. Wang, Clarivate Database, Accession No. 2015-838840, Dec. 2, 2015 (Dec. 2, 2015)", CN105109231/PN, pp. 1-3, XP055740654, Retrieved from www.clarivate.com [retrieved on Oct. 15, 2020].
International MoA Working Group, Insecticide Resistance Action Committee, "IRAC Mode of Action (MoA) Classification Scheme", Insecticide (2019), Version 9.3, pp. 1-30, retrieved from irac-online.org.

* cited by examiner

*Primary Examiner* — Dale R Miller
(74) *Attorney, Agent, or Firm* — Verrill Dana, LLP

(57) ABSTRACT

The invention relates to a composition comprising natamycin and at least one insecticide that interferes with the nervous system and/or muscular system of insects and nematodes. The invention further relates to methods employing natamycin and at least one insecticide that interferes with the nervous system and/or muscular system of insects and nematodes, preferably said composition, for protecting a plant or plant part, for improving the development and/or yield of an agricultural plant, and for protecting a soil and/or a growth substrate.

15 Claims, No Drawings

ANTIFUNGAL COMPOSITION COMPRISING NATAMYCIN AND AT LEAST ONE INSECTICIDE

FIELD

The invention relates to compositions to control fungal diseases on plants and plant parts and to improve development and yield of plants.

INTRODUCTION

Plants can be attacked by many different phytopathogenic fungi which cause tremendous losses in crops worldwide. Fungal growth may also result in loss of nutrients, formation of off flavors and destruction of tissue causing quality loss after processing. In many cases, fungal infections occur in the field after which the fungi develop during storage if the conditions are favorable resulting in post-harvest losses of e.g. grain, seed, flower bulbs, seed-potatoes, fruit and vegetables or moulding of processed foods such as breakfast cereals, juices or fruit cuts.

Phytopathogenic fungi in the soil, in the field (on agricultural plant parts such as seeds, bulbs and plants) and after harvesting (e.g. on cereals, vegetables and fruits) are generally controlled by fungicides, especially synthetic fungicides. However, many fungicides lose their activity over the years due to their repeated use which resulted in development of fungal resistance. This even occurred for new fungicides which had been on the market only for a short period of time, e.g. the occurrence of a single point mutation in relevant fungi that affects the performance of strobilurin fungicides. More commonly, resistance develops gradually so that the pathogen population becomes progressively less sensitive, such as the development of resistance in *Zymoseptoria tritici* to the azole fungicide group. Development of resistance will always result in an increasing number of treatments and the application of higher amounts and/or of more than one fungicide.

Many fungicides currently on the market will disrupt natural ecosystems by causing harmful effects, e.g. by contaminating water sources or because of undesirable effects on non-target organisms. Besides the environmental pollution, also human health problems especially with respect to worker's safety is an important issue. In addition, high residue levels of harmful fungicides on agricultural products at the moment of consumption, even exceeding the maximum residue limits, is a serious point of concern. Consumers and governmental regulators have increasing concerns resulting in stricter regulation in for example the EU, the USA, Japan and in many other countries.

It can be concluded that in spite of the availability of many commercial fungicides and their extensive use, fungi still develop on almost all crops and harvested agricultural products. In addition, it can be concluded that in agriculture there is a high need for environmental friendly alternatives to replace the harmful synthetic fungicides which are being applied today.

For many decades the polyene macrolide antifungal natamycin has been used to prevent fungal growth on food products, mainly cheeses and dry fermented sausages. Natamycin was first described in 1957 and is produced by fermentation using a *Streptomyces* species, e.g. *Streptomyces natalensis*. Nowadays this natural antimicrobial is widely used throughout the world as a food additive.

Natamycin has a long history of safe use and, more important, up to now resistant fungi have never been found in nature. Over the years quite some literature has been published describing a potential use of natamycin in many agricultural applications. However, it can be observed that this almost never resulted in commercial use of natamycin in agriculture. This may be due to the fact that the price of natamycin, which is routinely purified before use, is high for agricultural use, especially for field use.

There is a need for natural solutions for combatting fungi and reducing economic losses in agriculture, and especially for enhanced efficacies of natamycin that will allow its commercial use in agriculture.

BRIEF DESCRIPTION OF THE INVENTION

The invention provides an antifungal composition comprising natamycin and at least one insecticide that interferes with the nervous system and/or muscular system of insects and nematodes. Said at least one insecticide preferably is of subgroup 2, 3, 4, 6 and/or 28, which subgroups are identified in the document "IRAC Mode of Action Classification Scheme" (June 2019; version 9.3).

An exception may be provided by a bio-insecticide termed funnel spider peptide or "SPEAR bioinsecticide". This peptide is thought to target the nicotinic acetylcholine receptor and was recently found to have a novel "nerve and muscular" mode-of-action. The funnel spider peptide was inserted into a novel class 32, which may also be included as an insecticide that interferes with the nervous system and/or muscular system of insects and nematodes.

It was found that insecticides that disturb the nervous or muscular action in insects enhance the efficacy of natamycin against pathogenic fungi. This enhancement of natamycin efficacy was not found when it was combined with insecticides having other modes of action such as growth regulation, microbial disruptor of the insect midgut, energy metabolism (respiration) or unknown or non-specific mode of action (see "IRAC Mode of Action Classification Scheme" (June 2019; version 9.3).

Polyene fungicides such as natamycin have been reported to interact with the plasma membrane, especially with fungal membrane sterols. Although the mode of action of natamycin was reported to differ from that of other polyene fungicides, some reports also describe the interaction of natamycin with the main fungal sterol, ergosterol (te Welscher et al., 2008. J Biol Chem 283: 6393-6401), thereby modulating membrane fluidity and the function of membrane-bound enzymes. Ergosterol is the most abundant sterol in fungal cell membranes, where it regulates membrane permeability and fluidity (Douglas and Konopka, 2014. Annu Rev Microbiol 68: 377-393).

Without being bound by theory, the significant stimulation of activity of natamycin by the group of insecticides that interferes with the nervous system and/or muscular system of insects and nematodes is based on the mechanism that, in fungi or spores of fungi, these insecticides influence cell membranes and/or receptors, which renders them more vulnerable for natamycin. In these more vulnerable membranes natamycin can interfere more effectively with ergosterol in the cell membrane. As a result, spore and hyphae development by the fungi is more effectively inhibited by natamycin.

It is noted that a triazole such as propiconazole inhibits the synthesis of ergosterol. Hence, a triazole compound is not likely to synergize with an insecticide of subgroup 2, 3, 4, 6 and/or 28, as a triazole fungicide does not interfere directly with a component of the cell membrane.

An antifungal composition according to the invention preferably comprises 1% to 98% (w/w) of natamycin, preferably 6% to 60% (w/w) of natamycin, and 1% to 99% (w/w) of said at least one insecticide, preferably 5-50% (w/w). The ratio of natamycin over said at least one insecticide of subgroup 2, 3, 4, 6 and/or 28 preferably is between 1:1 and 1:5000 (w/w).

A preferred antifungal composition according to the invention comprises natamycin and at least one insecticide from fipronil, lambda-cyhalothrin, acetamiprid, clothianidin, imidacloprid, thiacloprid, thiamethoxam, abamectin and chlorantraniliprole. A further preferred antifungal composition according to the invention comprises at least two insecticides from fipronil, lambda-cyhalothrin, acetamiprid, clothianidin, imidacloprid, thiacloprid, thiamethoxam, abamectin and chlorantraniliprole.

An antifungal composition according to the invention may further comprise an agriculturally acceptable carrier.

An antifungal composition according to the invention preferably is an aqueous or oily composition.

In an embodiment, the natamycin in an antifungal composition according to the invention is produced by fermenting biomass by a fermentation organism.

The natamycin in an antifungal composition according to the invention is preferably fractionated, for example by milling, to an average particle size (volume particle size) of between 0.5 and 3 micrometer.

An antifungal composition according to the invention preferably further comprises an insoluble polyelectrolyte complex of a polyanion, such as a lignin-compound, and a polycation, such as chitosan or poly-allylamine, in relative amounts of between 1:2 and 60:1 (w/w).

The invention further provides a method for protecting an agricultural plant or plant part, comprising providing an antifungal composition according to the invention, and applying said composition to said agricultural plant or plant part. A preferred plant part is a seed, bulb, fruit or vegetable.

The invention further provides a method for improving the development and/or yield of an agricultural plant, comprising providing a composition according to the invention, and contacting the plant with said composition.

The invention further provides a method for protecting a soil and/or a growth substrate, the method comprising applying to said soil and/or a growth substrate a composition according to the invention. A preferred growth substrate is a mushroom growth substrate.

In a preferred method according to the invention, the antifungal composition is used either undiluted, or diluted up to $10^6$ times in an aqueous solution or in oil. The antifungal composition may be used either undiluted, or diluted up to 100 fold in an aqueous solution prior to providing the composition to a seed. The antifungal composition may be diluted, preferably between 10 and $10^6$ times, in an aqueous solution or in oil, prior to providing the composition to a plant, plant part, soil and/or growth substrate.

The invention further provides a use of an antifungal composition according to the invention for protecting a plant, plant part, soil and/or growth substrate against fungi.

DETAILED DESCRIPTION OF THE INVENTION

Definitions

The term "suspension concentrate", as used herein, refers to a suspension of solid particles in a liquid intended for dilution with water prior to use.

The term "soluble liquid", as used herein, refers to a solution in a liquid intended for dilution with water prior to use. Said liquid may be an aqueous liquid or a non-aqueous liquid, e.g. a petroleum-based solvent such as xylene or kerosin.

The term "suspo emulsion", as used herein, refers to a suspension of solid particles in water in combination with an oil phase in the form of an emulsion intended for dilution with water prior to use.

The term "dispersion concentrate", as used herein, refers to a dispersion of solid particles in a liquid intended for dilution with water prior to use.

The term "water dispersible granule", as used herein, refers to a formulation in granule form which is dispersible in water forming a dispersion such as a suspension or solution.

The term "wettable powder", as used herein, refers to a powder formulation intended to be mixed with water or another liquid prior to use.

The term "water slurriable powder," as used herein, refers to a powder formulation that is made into a slurry in water prior to use.

The term 'surfactant", as used herein, refers to ionic or non-ionic surface active agents. Examples of surfactants are alkyl-end-capped ethoxylate glycol, alkyl-end-capped alkyl block alkoxylate glycol, dialkyl sulfosuccinate, phosphated esters, alkyl sulfonates, alkyl aryl sulfonates, tristyrylphenol alkoxylates, natural or synthetic fatty acid alkoxylates, natural or synthetic fatty alcohols alkoxylates, alkoxylated alcohols (such as n-butyl alcohol poly glycol ether), block copolymers (such as ethylene oxide-propylene oxide block copolymers and ethylene oxide-butylene oxide block copolymers) or combinations thereof.

The term "increasing biological activity", as used herein, refers to an improvement of the curative, preventive and/or persistence performance of an active ingredient.

The term "plant part", as used herein, refers to single cells, cell clumps and plant tissues, including tissue cultures. Examples of plant parts include, but are not limited to, pollen, ovules, leaves, embryos, roots, root tips, anthers, flowers, fruits, shoots, scions, rootstocks, seeds, protoplasts, calli, and the like, preferably seeds.

Antifungal Composition

The invention provides an antifungal composition comprising natamycin and at least one insecticide that interferes with the nervous system and/or muscular system of insects and nematodes. Said at least one insecticide preferably is of subgroup 2 (GABA-gated chloride channel blocker), 3 (sodium channel modulator), 4 (competitive modulator of a nicotinic acetylcholine receptor), 6 (allosteric modulator of an glutamate-gated chloride channel) and/or 28 (Ryanodine receptor modulators), which subgroups are identified in the document "IRAC Mode of Action Classification Scheme" (June 2019; version 9.3). It was found that a combination of one or more of said insecticides and natamycin surprisingly increases the biological activity of said natamycin, i.e. the fungicidal activity of natamycin.

A preferred insecticide is a GABA-gated chloride channel blocker. A GABA-gated chloride channel blocker is thought to act on the nervous system of insects. A preferred GABA-gated chloride channel blocker is a cyclodiene, organochlorine and/or a phenylpyrazole. A preferred GABA-gated chloride channel blocker is fipronil ((±)-5-amino-1-(2,6-dichloro-α,α,α-trifluoro-p-tolyl)-4-trifluoromethyl sulfinylpyrazole-3-carbonitrile).

A preferred insecticide is a sodium channel modulator. A sodium channel modulator is thought to act on the nervous system of insects. A preferred sodium channel modulator is a pyrethroid and/or a pyrethrin. A preferred sodium channel modulator is a cyhalothrin ([cyano-(3-phenoxyphenyl) methyl] 3-[(Z)-2-chloro-3,3,3-trifluoroprop-1-enyl]-2,2-dimethylcyclopropane-1-carboxylate), preferably lambda-cyhalothrin ([(R)-cyano-(3-phenoxyphenyl)methyl] (1S,3S)-3-[(Z)-2-chloro-3,3,3-trifluoroprop-1-enyl]-2,2-dimethylcyclopropane-1-carboxylate).

A preferred insecticide is a competitive modulator of a nicotinic acetylcholine receptor. A nicotinic acetylcholine receptor competitive modulator is thought to act on the nervous system of insects. A preferred nicotinic acetylcholine receptor competitive modulator is a neonicotinoid. A preferred nicotinic acetylcholine receptor competitive modulator is acetamiprid (N-[(6-chloropyridin-3-yl)methyl]-N'-cyano-N-methylethanimidamide), imidacloprid (N-[1-[(6-chloropyridin-3-yl)methyl]-4,5-dihydroimidazol-2-yl]nitramide), thiacloprid ([3-[(6-chloropyridin-3-yl)methyl]-1,3-thiazolidin-2-ylidene]cyanamide), and/or thiamethoxam (N-[3-[(2-chloro-1,3-thiazol-5-yl)methyl]-5-methyl-1,3,5-oxadiazinan-4-ylidene]nitramide).

A preferred insecticide is an allosteric modulator of an glutamate-gated chloride channel. An allosteric modulator of an glutamate-gated chloride channel is thought to act on the nervous system of insects. A preferred allosteric modulator of an glutamate-gated chloride channel is an avermectin and/or milbemycin. A preferred allosteric modulator of an glutamate-gated chloride channel is abamectin ((1'R,2R,3S,4'S,6S,8'R,10'E,12'S,13'S,14'E,16'E,20'R,21'R,24'S)-2-butan- 2-yl-21',24'-dihydroxy-12'-[(2R,4S,5S,6S)-5-[(2S,4S,5S,6S)-5-hydroxy-4-methoxy-6-methyloxan-2-yl]oxy-4-methoxy-6-methyloxan-2-yl]oxy-3,11',13',22'-tetramethylspiro[2,3-dihydropyran-6,6'-3,7,19-trioxatetracyclo[15.6.1.14,8.020,24]pentacosa-10,14,16,22-tetraene]-2'-one;(1'R,2R,3S,4'S,6S,8'R,10'E,12'S,13'S,14'E,16'E,20'R,21'R,24'S)-21',24'-dihydroxy-12'-[(2R,4S,5S,6S)-5-[(2S,4S,5S,6S)-5-hydroxy-4-methoxy-6-methyloxan-2-yl]oxy-4-methoxy-6-methyloxan-2-yl]oxy-3,11',13',22'-tetramethyl-2-propan-2-ylspiro[2,3-dihydropyran-6,6'-3,7,19-trioxatetracyclo[15.6.1.14,8.020,24]pentacosa-10,14,16,22-tetraene]-2'-one), emamectin benzoate ([(2S,3S,4S,6S)-6-[(2S,3S,4S,6R)-6-[(1'11,2R,3S,4'S,6S,8'R,10'E,12'S,13'S,14'E,16'E,20'R,21'R,24'S)-2-[(2S)-butan-2-yl]-21',24'-dihydroxy-3,11',13',22'-tetramethyl-2'-oxospiro[2,3-dihydropyran-6,6'-3,7,19-trioxatetracyclo[15.6.1.14,8.020,24]pentacosa-10,14,16,22-tetraene]-12'-yl]oxy-4-methoxy-2-methyloxan-3-yl]oxy-4-methoxy-2-methyloxan-3-yl]-methylazanium;benzoate), lepimectin ([[(1R,4S,5'S,6R,6'R,8R,10E,12R,13S,14E,16E,20R,21R,24S)-6'-ethyl-21,24-dihydroxy-5',11,13,22-tetramethyl-2-oxospiro[3,7,19-trioxatetracyclo[15.6.1.14,8.020,24]pentacosa-10,14,16,22-tetraene-6,2'-oxane]-12-yl] (2Z)-2-methoxyimino-2-phenylacetate), and/or milbemectin ((1R,4S,5'S,6R,6'R,8R,10E,13R,14E,16E,20R,21R,24S)-21,24-dihydroxy-5',6',11,13,22-pentamethylspiro[3,7,19-trioxatetracyclo[15.6.1.14, 8.020,24] pentacosa-10,14,16,22-tetraene-6,2'-oxane]-2-one).

A preferred insecticide is a ryanodine receptor modulator. A ryanodine receptor modulator is thought to act on the nervous system of insects. A preferred ryanodine receptor modulator is a diamide. A preferred diamide is chlorantraniliprole (5-bromo-N-[4-chloro-2-methyl-6-(methylcarbamoyl)phenyl]-2-(3-chloropyridin-2-yl)pyrazole-3-carboxamide).

A composition of the invention preferably comprises 1% to 98% (w/w) of natamycin, preferably 6% to 60% (w/w) of natamycin. A composition of the invention preferably comprises 1% to 99% (w/w) of said at least one insecticide, preferably 5- to 50% (w/w). A undiluted composition of the invention preferably comprises 1% to 98% (w/w) of natamycin, preferably 6% to 60% (w/w) of natamycin. and 1% to 90% (w/w) of said at least one insecticide, preferably 5 to 50% (w/w).

The synergistic effects of an insecticide of subgroup 2, 3, 4, 6 and/or 28 (see IRAC Mode of Action Classification Scheme) on the fungicidal activity of natamycin is seen over a broad range of insecticide concentrations. A reason for this may be that said insecticides influence proteins in cell membranes of fungi which render these membranes more vulnerable for natamycin. As a result, spore and hyphae development are more effectively inhibited by natamycin.

It is preferred that the composition is characterized by the ratio of natamycine:insecticide (w/w). It is noted that an upper range of said at least one insecticide is difficult to determine as insecticides start to have fungicidal activity at higher concentrations by themselves. The experiments suggest that an upper range of said insecticide might not exist. The examples show that synergism regarding the fungicidal activity of natamycin can be observed at ratios of 1:2500 and even 1:7520 (w/w) (natamycin:insecticide). A preferred ratio between natamycin and an insecticide of subgroup 2, 3, 4, 6 and/or 28, preferably between natamycin and at least one insecticide selected from fipronil, lambda-cyhalothrin, acetamiprid, clothianidin, imidacloprid, thiacloprid, thiamethoxam, abamectin and chlorantraniliprole, therefore is between (natamycin:insecticide) 1:1 (w/w) and 1:10.000 (w/w), such as between 1:2 and 1:250, such as 1:50 and 1:100. A preferred ratio includes: 1:2, 1:3,1:4 and 1:5.

It will be understood by a person skilled in the art that said ratio preferably is between (natamycin:insecticide) 1:1 and 1:100 (w/w) for seed and soil applications. A reason for this is a need to treat seeds with high amounts of an insecticide such that protection by the insecticide is prolonged into the embryo and, preferably, even in the seedling stage.

A composition of the invention preferably is fractionated, preferably by milling, for example using a bead mill such as Dynomill®. The volume-based average particle size of natamycin preferably is between 0.2 and 10 micrometer, preferably between 0.5 and 5 micrometer, more preferably between 0.5 and 2 micrometer. Methods for determining a volume-based average particle size of a composition according to the invention are known to the skilled person. For example, Hukkanen and Braatz, 2003. Sensors and Actuators B 96: 451-459, discuss varies methods that can be used for determining the average particle size of a composition, including forward light scattering and ultrasonic extinction. A preferred method is based on laser diffraction analysis, for example using a Analysette 22-MicroTec plus laser-particle-sizer (Fritsch, Idar-Oberstein, Germany).

An antifungal composition according to the invention may include cellular matter. Said natamycin in a composition according to the invention is preferably produced by fermenting biomass by a fermentation organism and the cellular matter that is present in the composition is from said natamycin-producing fermentation organism. Said natamycin-producing fermentation organism includes, for example, *Streptomyces natalensis* and *Streptomyces gilvosporeus.*

Said cellular matter preferably includes compounds that are remnants of natamycin-producing bacteria, or compounds excreted by the natamycin-producing bacteria. Examples of such compounds are compounds of the bacterial cell envelope, which includes the plasma membrane and the cell wall of a natamycin-producing bacterium. Such compounds include phospholipids such as phospholipids and glycolipids which, upon hydrolysis such as by addition of sodium hydroxide, result in fatty acids, such as C16-C18 fatty acids.

Methods for producing natamycin by fermenting biomass by a fermentation organism such as *Streptomyces natalensis* and *Streptomyces gilvosporeus* are known in the art. Methods to purify the produced natamycin away from the bulk of the biomass are known in the art. For example, disintegration of the biomass may result in lysis and destruction of all cells of the production organism. The resulting broth comprising natamycin may be filtered to obtain a filtration cake, which subsequently is treated with an alcohol, preferably methanol and/or ethanol, to disintegrate the biomass and to dissolve at least a portion of the natamycin. If necessary, the pH may be increased to solubilize the natamycin. Subsequent neutralization will result in precipitation at least a portion of natamycin.

A composition of the invention preferably is an aqueous or non-aqueous, preferably oily, concentrated stock composition which may be diluted with a suitable diluent such as e.g. water or oil before use; or an aqueous or non-aqueous ready-to-use composition.

A composition of the invention may be used for soil treatment, to prepare a seed treatment like seed dressing or seed coating, a coating emulsion (e.g. for fruit or plants in the field), a wax that is applied on fruit (e.g. pineapples, oranges or apples), an oil that is applied by spraying plants in the field (e.g. bananas). A composition of the invention also includes a concentrated dry composition such as e.g. a granulate, a powder and/or a tablet which can be used to prepare compositions for immersions, spraying or dipping agricultural products.

An antifungal composition of the invention preferably is a suspension concentrate (SC), a water dispersible granule (WG), a wettable powder (WP), a suspo emulsion (oily) (SE), oil dispersion (OD), a dispersion concentrate (DC), a dry powder seed treatment composition (DS), a water slurriable powder (WS), a flowable seed treatment composition (FS), a water dispersible granule seed treatment composition (WG), a suspo emulsion (SE) or a soluble liquid (SL).

An antifungal composition of the invention preferably comprises a polyelectrolyte complex of a polyanion and a polycation as described in the published international patent application WO2013/133706, which is incorporated herein by reference, or any other encapsulation technology known in the art, e.g. liposomes, lipid structures or empty cells of e.g. yeast in which the composition of the invention is encapsulated.

Said polyelectrolyte complex is a complex of oppositely charged polyelectrolytes (a polyanion and a polycation) which form strong electrostatic links. Said polyelectrolyte complex is an insoluble complex. This complex alone does not have antimicrobial efficacy. The polyelectrolyte complex has sticky properties and contains polar parts (charged) and apolar parts. The aromatic moieties in the complex may have affinity for antimicrobial compounds such as, for example, natamycin. In combination with the sticky character of the polyelectrolyte complex, the antimicrobial compound will be optimally deposited and adhered to the soil for use in agriculture, horticulture and mushroom cultivation.

The polyelectrolyte complex comprises a polyanion, such as a lignin-compound, for example lignosulfonate, humic acid, chondroitin sulphate and poly(acrylic acid), and a polycation, such as chitosan, epsilon poly (L) lysine, and poly-allylamine, in a relative amount of between 1:2 and 60:1 (w/w), more preferred between 1:1 and 50:1, more preferred between 2:1 and 30:1, such as about 2:1, about 5:1, about 10:1; about 15:1, about 20:1, about 25:1 and about 30:1 (w/w). The relative amounts of a polyanion, preferably a lignin compound, and a polycation, preferably a chitosan, in a polyelectrolyte complex is most preferred about 5:1 (w/w).

The polyelectrolyte complex is preferably present in a composition of the invention in a concentration between 5-800 g/l, more preferably 50-500 and most preferably 75-250 g/l of a composition of the invention.

An antifungal composition according to the invention may further comprise one or more agriculturally acceptable carriers. Said agriculturally acceptable carrier preferably is or includes a stabilizer, a wetting agent, a dispersant, an antifreezing agent, an antifoaming agent and/or a thickening agent. The addition of small amounts of one or more agriculturally acceptable carriers may affect, preferably improve, parameters such as stability and/or efficacy of a composition according to the invention. The addition of small amounts of one or more agriculturally acceptable carriers preferably increases stability, efficacy and/or rainfastness of a composition according to the invention.

A stabilizer, when present, is preferably selected from carboxylic acids such as citric acid, acetic acid, and/or dodecylbenzensulfonic acid, orthophosphoric acid dodecylbenzensulfonic acid and suitable salts thereof. A composition of the invention may also comprise two or more different stabilizers. A stabilizer is preferably present in an amount of between 0 to up to 10% (w/v), more preferred between 0.01 to up to 5% (w/v), more preferred between 0.02 to up to 1% (w/v), more preferred about 0.05% (w/v).

A wetting agent, when present, is preferably selected from di-octylsuccinate, polyoxyethylene/polypropylene and tristearyl sulphonate/phosphate. A composition of the invention may also comprise two or more different wetting agents. A wetting agent is preferably present in an amount of between 0 to up to 10% (w/v), more preferred between 0.01 to up to 5% (w/v), more preferred between 0.02 to up to 1% (w/v), more preferred about 0.05% (w/v).

A dispersant, when present, is preferably selected from Morwet® D425, lignin sulphonate, an alkylpolysaccharide, an styrene acrylic polymer, an acrylic co-polymer, and ethoxylated tristyrenephenol phosphate, for example polyethoxylated fosforic acid. A composition of the invention may also comprise two or more different dispersants. A dispersant is preferably present in an amount of between 0 to up to 10% (w/v), more preferred between 0.01 to up to 5% (w/v), more preferred between 0.02 to up to 1% (w/v), more preferred about 0.05% (w/v).

An antifreezing agent, when present, is preferably selected from glycerine, ethylene glycol, hexyleneglycol and propylene glycol. A composition of the invention may also comprise two or more different antifreezing agents. An antifreezing agent is preferably present in an amount of between 0 to up to 10% (w/v), more preferred between 0.01 to up to 5% (w/v), more preferred between 0.02 to up to 1% (w/v), more preferred about 0.05% (w/v).

An anti-foam forming agent, when present, is preferably selected from polymethylsiloxane, polydimethylsiloxane, simethicone octanol, and silicone oils. A composition of the invention may also comprise two or more different anti-foam forming agents. An anti-foam forming agent is preferably present in an amount of between 0 to up to 10% (w/v), more preferred between 0.05 to up to 5% (w/v), more preferred between 0.1 to up to 1% (w/v), more preferred about 0.05% (w/v).

A thickening agent, when present, is preferably selected from agar, alginic acid, alginate, carrageenan, gellan gum, xanthan gum, succinoglycan gum, guar gum, acetylated distarch adipate, acetylated oxidised starch, arabinogalactan, ethyl cellulose, methyl cellulose, locust bean gum, starch sodium octenylsuccinate, and triethyl citrate. A composition of the invention may also comprise two or more different thickening agents. A thickening agent is preferably present in an amount of between 0 to up to 10% (w/v), more preferred between 0.01 to up to 5% (w/v), more preferred between 0.02 to up to 1% (w/v), more preferred about 0.05% (w/v).

A composition according to the invention provides a stable aqueous suspension comprising a high concentration of natamycin and said at least one insecticide, up to about 30% (w/v), with improved fungicidal activity compared to commercially available formulations of said natamycin, in the presence of relatively low amounts of adjuvants as agriculturally acceptable carriers.

In some embodiments, the composition further includes one or more physical stabilizers and/or additives such as buffers, acidifiers, and drift retardants, pigments, safeners, and preservatives.

Methods of Use

The invention further provides a method for protecting an agricultural plant or agricultural plant part comprising providing natamycin and at least one insecticide that interferes with the nervous system and/or muscular system of insects and nematodes, and applying said natamycin and at least one insecticide to an agricultural plant or plant part such that the agricultural plant or agricultural plant part is contacted with a sufficient amount of said natamycin and at least one insecticide.

A preferred method for protecting an agricultural plant or agricultural plant part comprises providing a composition according to the invention, and applying said composition to an agricultural plant or plant part such that the agricultural plant or agricultural plant part is contacted with a sufficient amount of said composition.

Said method preferably is for protecting the plant or plant part from a fungus, preferably from a mould.

The terms "plant" and "crop", as are used herein, both refer to a cultivated plant, tree or fungus that is cultivated for food, clothing, livestock fodder, biofuel, medicine, or other use.

Said plant part preferably is a leaf, stem, seed, bulb, flower bulb, seed-potato, root, tuber, fruit and/or vegetable, most preferably a seed, bulb, fruit or vegetable.

The invention further provides a method for improving the development and/or yield of an agricultural plant, comprising providing natamycin and at least one insecticide that interferes with the nervous system and/or muscular system of insects and nematodes, and contacting the plant with said natamycin and at least one insecticide that interferes with the nervous system and/or muscular system of insects and nematodes.

A preferred method for improving the development and/or yield of an agricultural plant, comprising providing a composition according to the invention, and contacting the plant with said composition.

A composition comprising natamycin and a composition comprising at least one insecticide that interferes with the nervous system and/or muscular system of insects and nematodes, preferably a composition of the invention, can be applied in many different ways. For example, said composition or compositions can be applied by: (1) spraying plants in the field or in greenhouses optionally using a carrier such as a wax or an oil; (2) dipping seeds, bulbs or seed-potatoes; (3) adding to a plant part such as a seed or root system e.g. via the soil; (4) adding to a plant part such as a seed, seed-potato or bulb via a seed coating or a seed dressing; (5) adding to the soil or growth substrate in which the seeds are to be planted or germinating and/or plants or mushrooms are developing; (6) adding to water or watering systems applied in e.g. greenhouses or in the field; (7) treating harvested plant parts such as bulbs, seeds, cereals, soybeans, flowers, fruit, vegetables or plants by e.g. dipping or spraying.

A composition of the invention can be applied without diluting or after dilution. Usually the composition of the invention will be applied via an aqueous or oil dilution, via a dressing, coating or a wax. A composition according to the invention is preferably undiluted or diluted. A composition according to the invention is preferably undiluted or diluted up to 10 fold or 100 fold for seed treatment. A composition according to the invention is preferably diluted between 10 and $10^6$ times in an aqueous solution or in oil, for other applications in the methods of the invention. It is easy to understand that the required amount of the composition of the invention will differ per application as different applications may require different treatments. In general, however, the amount of composition in a ready-to-use composition such as e.g. a dipping or spraying suspension, calculated back to the amount of natamycin in the composition, required to treat the product (e.g. a growth substrate, a soil, a seed, a bulb, a plant in the field or a harvested fruit) will be 10-100,000 ppm of natamycin, more preferably 30-50.000 ppm of natamycin and most preferably 50-5000 ppm of natamycin.

The final amount of natamycin in a soil or growth medium, on a plant or on a harvested plant part can be expressed in different ways. As a first example, the amount of natamycin on e.g. a seed applied via e.g. a seed dressing or a seed coating is 0.01 to 20.0 grams of natamycin per kg of seed, more preferably 0.05-5.0 grams of natamycin per kg of seed, most preferably 0.1-2.0 grams of natamycin per kg of seed.

As a second example, a composition of the invention for immersion or spraying of products such as flower bulbs, seed-potatoes, onions, apples, pears, bananas and pineapples will generally comprise 0.01 g/l to 100 g/l, preferably 0.03 g/l to 50 g/l and most preferably 0.05 g/l to 5 g/l of natamycin.

After treatment of products such as flower bulbs, seed-potatoes, onions, apples, pears, bananas and pineapples, typically the amount of natamycin on the product is 0.01-20.0 mg/dm$^2$; preferably 0.1-10.0 mg/dm$^2$.

In case of treatment of growth substrate such as mushroom growth substrate, each spray treatment will add 0.01-5.0 grams of natamycin per m$^2$ of growth substrate, more preferably 0.02-1.0 grams of natamycin per m$^2$ of growth substrate.

In case of treatment of a soil in which e.g. vegetables or ornamental plants are grown 0.01-5.0 grams of natamycin is applied per m$^2$ which is preferably mixed in the top layer of the soil, more preferably 0.1-1.0 grams of natamycin per m$^2$. In case of a spray application on a crop in the field a typical dosage is 1-5000 grams of natamycin per hectare, more preferably 50-2000 grams per hectare. However, for a crop such as bananas, the preferred dosage of natamycin is 5-500 grams per hectare, more preferably 10-100 grams per hectare.

Natamycin and at least one insecticide that interferes with the nervous system and/or muscular system of insects and nematodes, preferably a composition of the invention, can be added at any suitable time using any suitable method to the growth medium, soil, plant or plant part; e.g. before, during or after planting of e.g. a seed, bulb, seed-potato, a cutting or a young plant; during growth in the field, after harvesting or during storage of a fruit, vegetable, nut or flower bulb.

An aspect of the invention provides a use of at least one insecticide that interferes with the nervous system and/or muscular system of insects and nematodes, for increasing biological activity of natamycin. Said use according to the invention may result in a reduced rate of application of said natamycin and/or an increase of the biological activity of said natamycin.

An aspect of the invention provides the application of at least one insecticide that interferes with the nervous system and/or muscular system of insects and nematodes, for increasing biological activity of natamycin that is present in or on a plant, plant part, or soil. Said insecticide may increase the biological activity of said natamycin. Said at least one insecticide preferably is of subgroup 2 (GABA-gated chloride channel blocker), 3 (sodium channel modulator), 4 (competitive modulator of a nicotinic acetylcholine receptor), 6 (allosteric modulator of an glutamate-gated chloride channel) and/or 28 (Ryanodine receptor modulators), as identified in the document "IRAC Mode of Action Classification Scheme" (June 2019; version 9.3).

The terms "reduced rate of application" and "increasing biological activity" may refer to a rate of application that is more than 10%, preferably more than 30%, reduced, when compared to the rate of application of natamycin without the at least one insecticide.

Said reduced rate of application may refer to an application rate of 5 mg active ingredient (a.i.)/ha to 2.5 kg a.i./ha, preferably 1 g a.i./ha to 2 kg a.i./ha., such as a rate of 100-750 g a.i./ha., including a rate of 600 g a.i./ha., a rate of 500 g a.i./ha., a rate of 400 g a.i./ha., a rate of 300 g a.i./ha., a rate of 200 g a.i./ha., and a rate of 100 g a.i./ha.

An antifungal composition according to the invention is suitable for the control of pests that are encountered in horticulture, agriculture, and forestry. The antifungal composition is active against normally sensitive and resistant pest species and during all or individual stages of development. Prior to use, a composition comprising an antifungal composition according to the invention is preferably dissolved or dispersed in water, or diluted with water, to provide an aqueous composition comprising between 0.001 and 10 w/v % of the bioactive natamycine. If required, an agriculturally acceptable carrier such as a sticking agent is added to the diluted aqueous composition.

A composition according to the invention is preferably diluted 2-5000 times, preferably about 200 times, with an aqueous solvent, preferably water, to contain between 0.0001 and 10% (w/v) of the natamycin, prior to contacting a plant, plant part or soil with the composition.

To control agricultural pests, the invention provides a use of natamycin and an insecticide that interferes with the nervous system and/or muscular system of insects and nematodes, preferably of a composition comprising natamycin and at least one insecticide according to the invention for the protection of a plant, or a part of a plant, against a pathogen. In order to achieve this effect, said plant or plant part, or a soil, is contacted with said natamycin and an insecticide that interferes with the nervous system and/or muscular system of insects and nematodes, preferably with said composition, including the diluted aqueous composition as described herein above. Said natamycin and an insecticide that interferes with the nervous system and/or muscular system of insects and nematodes, preferably said composition, is used, for example, to control powdery mildew and *Botrytis* infections on food/feed crops, including tree fruits, vegetable crops, field crops, grapes, ornamental plants, and sod farms. Further use, for example, is to control scab, including common scab, apple scab and black scab on potatoes, pear scab, and powdery scab, brown rot of peaches, currant and gooseberry leaf spot, *Fusarium* diseases, peanut leafspot, and mildew on roses. Other uses include protection of greenhouse grown flowers and ornamentals, home vegetable gardens and residential turf. In addition, said natamycin and an insecticide that interferes with the nervous system and/or muscular system of insects and nematodes, preferably said composition, including a diluted aqueous composition, may be contacted with isolated seeds, fruits, nuts, vegetables, and/or flowers.

The invention further provides a method of protecting a plant or plant part against a pathogen, comprising contacting said plant or said plant part with natamycin and an insecticide that interferes with the nervous system and/or muscular system of insects and nematodes, preferably with a diluted aqueous composition according to this invention comprising natamycine and a nerve and muscle insecticide, preferably an insecticide of subgroup 2, 3, 4, 6 and/or 28, which subgroups are identified in the document "IRAC Mode of Action Classification Scheme" (June 2019; version 9.3).

The invention further provides a method of preventing, reducing and/or eliminating the presence of a pathogen on a plant, or a part of a plant, comprising contacting said plant, or part of said plant, with natamycin and an insecticide that interferes with the nervous system and/or muscular system of insects and nematodes, preferably with an aqueous composition according to this invention.

For said use and said methods, the natamycin and insecticide that interferes with the nervous system and/or muscular system of insects and nematodes, preferably said composition, including a diluted aqueous composition, is preferably sprayed over a plant, or part thereof. Spraying applications, including the use of automatic spraying systems are known to reduce labor costs and are cost-effective. Methods and equipment well-known to a person skilled in the art can be used for that purpose. The natamycin and insecticide that interferes with the nervous system and/or muscular system of insects and nematodes, preferably said composition, including diluted aqueous composition, can regularly be sprayed, when the risk of infection is high. When the risk of infection is lower, spray intervals may be longer, as is known to a person skilled in the art.

Other methods suitable for contacting plants or parts thereof with natamycin and an insecticide that interferes with the nervous system and/or muscular system of insects and nematodes, preferably with a composition of the invention are also a part of the present invention. These include, but are not limited to, dipping, watering, drenching, introduction into a dump tank, vaporizing, atomizing, fogging, fumigating, painting, brushing, misting, dusting, foaming, spreading-on, packaging and coating (e.g. by means of wax or electrostatically). In addition, natamycin and an insecticide that interferes with the nervous system and/or muscular system of insects and nematodes, preferably the composition of the invention, including a diluted aqueous composition, may be injected into the soil.

For example, a plant of part thereof may be coated with natamycin and an insecticide that interferes with the nervous system and/or muscular system of insects and nematodes, preferably with a diluted aqueous composition comprising natamycin and at least one insecticide according to the invention by submerging the plant or part thereof in natamycin and an insecticide that interferes with the nervous system and/or muscular system of insects and nematodes, preferably in a diluted aqueous composition according to the invention, to protect the plant of part thereof against a pathogen and/or to prevent, reduce and/or eliminate the presence of a pathogen on a plant, or a part of a plant.

A preferred part of a plant that is coated with natamycin and an insecticide that interferes with the nervous system and/or muscular system of insects and nematodes, preferably with a composition according to the invention, or with a dilution thereof, is seed. A further preferred part of a plant that is coated with natamycin and an insecticide that interferes with the nervous system and/or muscular system of insects and nematodes, preferably with a composition according to the invention, or with a dilution thereof, is a fruit, preferably a post-harvest fruit such as, for example, a citrus fruit such as orange, mandarin and lime, a pome fruit such as apple and pear, a stone fruit such as almond, apricot, cherry, damson, nectarine, tomato, watermelon, a tropical fruit such as banana, mango, lychee and tangerine. A preferred fruit is a citrus fruit, such as orange and/or a tropical fruit such as banana.

The invention further provides a method of controlling diseases caused by phytopathogenic fungi in plants or on propagation material thereof, which method comprises contacting the plants, or propagation material thereof, with a natamycin and an insecticide that interferes with the nervous system and/or muscular system of insects and nematodes, preferably with a composition according to the invention, including an aqueous diluted composition.

The present invention also provides a method of controlling pests comprising contacting (i) a pest or a locus thereof, (ii) a plant or a locus or propagation material thereof, (iii) soil, and/or (iv) an area in which a pest infestation is to be prevented with natamycin and an insecticide that interferes with the nervous system and/or muscular system of insects and nematodes, preferably with a composition comprising natamycin and at least one insecticide of the invention.

The present invention also provides a method for improving pest control comprising applying natamycin and an insecticide that interferes with the nervous system and/or muscular system of insects and nematodes, preferably a composition described herein to a plant/or soil.

The present invention also provides a method for prolonging a controlling effect of natamycin on a plant, plant part of soil, comprising applying natamycin and an insecticide that interferes with the nervous system and/or muscular system of insects and nematodes, preferably a composition of the invention or dilution thereof, to the plant, plant part or soil.

In some embodiments, the target is a plant, plant part, soil or growth substrate. In some embodiments, the target is a fungus.

The present invention also provides a method for pest control by preventive, curative or persistence treatment of a plant disease caused by phytopathogenic fungi comprising contacting a plant, a locus thereof or propagation material thereof with an effective amount of natamycin and an insecticide that interferes with the nervous system and/or muscular system of insects and nematodes, preferably with a composition comprising natamycin and at least one insecticide according to the invention.

The described compositions comprising natamycin and at least one insecticide according to the invention may be applied to healthy or diseased plants. The described compositions can be used on various plants including but not limited to crops, seeds, bulbs, propagation material, or ornamental species.

The present invention provides a method of controlling a disease caused by phytopathogenic fungi on plants or propagation material thereof, comprising contacting the plants, the locus thereof or propagation material thereof with natamycin and an insecticide that interferes with the nervous system and/or muscular system of insects and nematodes, preferably with a composition comprising natamycin and at least one insecticide according to the invention.

In some embodiments, the fungus is one of Leaf Blotch of Wheat (*Mycosphaerella graminicola*; anamorph: *Septoria tritici*), Wheat Brown Rust (*Puccinia triticina*), Stripe Rust (*Puccinia striiformis* f. sp. *tritici*), Scab of Apple (*Venturia inaequalis*), Blister Smut of Maize (*Ustilago maydis*), Powdery Mildew of Grapevine (*Uncinula necator*), Barley scald (*Rhynchosporium secalis*), Blast of Rice (*Magnaporthe grisea*), Rust of Soybean (*Phakopsora pachyrhizi*), Glume Blotch of Wheat (*Leptosphaeria nodorum*), Powdery Mildew of Wheat (*Blumeria graminis* f. sp. *tritici*), Powdery Mildew of Barley (*Blumeria graminis* f. sp. *hordei*), Powdery Mildew of Cucurbits (*Erysiphe cichoracearum*), Anthracnose of Cucurbits (*Glomerella lagenarium*), Leaf Spot of Beet (*Cercospora beticola*), Early Blight of Tomato (*Alternaria solani*), and Net Blotch of Barley (*Pyrenophora teres*).

In some embodiments, natamycin and an insecticide that interferes with the nervous system and/or muscular system of insects and nematodes, preferably the composition comprising natamycin and at least one insecticide according to the invention, is applied at a rate effective for controlling a pest. In some embodiments, natamycin and an insecticide that interferes with the nervous system and/or muscular system of insects and nematodes, preferably the composition comprising natamycin and at least one insecticide according to the invention is applied at a rate effective for preventing infestation of the pest. In some embodiments, natamycin and an insecticide that interferes with the nervous system and/or muscular system of insects and nematodes, preferably the composition comprising natamycin and at least one insecticide according to the invention is applied at a rate effective for curing infestation of the pest.

In some embodiments, a method of the invention is effective for preventing infestation of a pest. In some embodiments, the method is effective for curing infestation of the pest. In some embodiments, the method is effective for increasing the pesticidal activity of natamycin. In some embodiments, the method is effective for prolonging the pesticidal effect of the natamycin.

In some embodiments, a method of the invention is effective for decreasing the half maximal effective concentration (EC50) of natamycin. In some embodiments, the method is effective for decreasing the EC50 by at least 10%. In some embodiments, the method is effective for decreasing the EC50 by at least 25%. In some embodiments, the method is effective for decreasing the EC50 by at least 35%. In some embodiments, the method is effective for decreasing the EC50 by at least 50%.

In some embodiments, a method of the invention is effective for decreasing the LC50 of natamycin. In some embodiments, the method is effective for decreasing the LC50 by at least 10%. In some embodiments, the method is effective for decreasing the LC50 by at least 25%. In some embodiments, the method is effective for decreasing the LC50 by at least 50%. In some embodiments, the method is effective for decreasing the LC50 by at least 75%. In some embodiments, the method is effective for decreasing the LC50 by at least 90%.

In some embodiments, a method of the invention is effective for decreasing the LC90 of natamycin. In some embodiments, the method is effective for decreasing the LC90 by at least 10%. In some embodiments, the method is effective for decreasing the LC90 by at least 25%. In some embodiments, the method is effective for decreasing the LC90 by at least 50%. In some embodiments, the method is effective for decreasing the LC90 by at least 75%. In some embodiments, the method is effective for decreasing the LC90 by at least 90%. In some embodiments, a method of the invention further comprises applying at least one additional agrochemical to a pest, a plant part, a plant, the locus, or propagation material thereof. Said additional agrochemical may be admixed in a tank, or applied sequentially with natamycin and an insecticide that interferes with the nervous system and/or muscular system of insects and nematodes, preferably with the composition comprising natamycin and at least one insecticide to the plants, plant parts, soil or growth substrate.

The invention is illustrated by the following examples without limiting it thereby.

EXAMPLES

General

1. Natamycin Formulation Used in the Experiments

Natamycin was tested on apples at concentrations of 0 (control), 50, 100 ppm and 200 ppm. Natamcyin was formulated as shown in Table 1:

TABLE 1

| Natamycin formulation used in the examples. | |
|---|---|
| Natamycin formulation | g/l |
| Natamycin | 150 |
| Atlox 4913 | 25 |
| Morwet D425 | 10 |
| Acticide MBS (200 ppm) | 0.2 |
| Glycerol | 252 |
| Rhodorsil 426R | 6 |
| Rhodopol 23 | 1.3 |
| Water up to 1 litre | |

2. Insecticide Formulations Used in the Experiments

The insecticidal active ingredients Thiamethoxam (Merck; 37924), Imidacloprid (Merck; 37894), Abamectin (Merck; 31732) and Chlorpyrifos (Merck; 45395) were formulated in the compositions as presented in Table 2.

TABLE 2

Insecticide formulations of Thiamethoxam, Imidacloprid, Abamectin and Chlorpyrifos that were used for the active ingredients.

| Composition | [%] |
|---|---|
| Thiamethoxam | 33.5 |
| Atlox 4913 | 7.6 |
| Atlas 5002L | 5.1 |
| Propylene glycol | 12.7 |
| Cresmer ad09 | 0.8 |
| Proxel GXL | 0.5 |
| Water | 39.8 |
| Total | 100.0 |
| Imidacloprid | 39.9 |
| Atlox 4913 | 2.2 |
| Atlox 4894 | 2.2 |
| Cresmer ad09 | 0.1 |
| Proxel GXL | 0.2 |
| Water | 50.0 |
| Xanthan gum | 0.4 |
| Propylene glycol | 5.2 |
| Total | 100.0 |
| Abamectin | 18.0 |
| Atlox 4838B | 9.0 |
| Etocas 10 | 2.8 |
| Etocas 35 | 2.8 |
| N.N-Dimethylformamide | 10.0 |
| N-Methyl-2-pyrrolidone | 57.5 |
| Total | 100.0 |
| Chlorpyrifos | 40.0 |
| Xylene | 50.0 |
| Atlox 4838B | 3.3 |
| Etocas 10 | 3.3 |
| Etocas 35 | 3.3 |
| Total | 100.0 |

For the active ingredients Fipronil, Lambda-Cyhalothrin, alpha-Cypermethrin, Acetamiprid, Emamectin benzoate, Chlorantraniliprole, Flubendiamide, Fenoxycarb, *Bacillus thuringiensis*, Chlorfenapyr and Azadirachtin commercial products were used (see Table 3).

3. Dose Rates of Insecticides Applied in the Examples

In the examples natamycin is combined with standard label dose rates of insecticides. The amount of insecticides active ingredient used in the examples is provided in Table 3.

TABLE 3

Insecticide concentrations used in the combination examples with natamycin.

| Insecticide active ingredient | Example of product with AI | A.I. used for seed treatment per 100 kg of seeds (g)* |
|---|---|---|
| Insecticides active on nerve or muscular tissue | | |
| Fipronil | Goliath ® or Cosmos ® (BASF) | 75 |
| Lambda-Cyhalothrin | Kusti, Kendo (Syngenta) | |
| alpha-Cypermethrin | Fendona ® or Fastac ® SC (BASF) | |
| Acetamiprid | INSYST ® (Certis) | |
| Imidacloprid | Confidor ® (Syngenta) or Gaucho ® 600, (Bayer) | 90 |
| Abamectin | Vertimec (Syngenta) | |
| Emamectin benzoate | Affirm (Syngenta) | |
| Chlorantraniliprole | Lumivia ™ (DuPont) | 60-250 |
| Flubendiamide | Belt ® (Bayer) | |
| Insecticides active on growth regulation | | |
| Fenoxycarb | INSEGAR (Syngenta) | |
| Insecticides active on microbial disruptor insect midgut | | |
| *Bacillus thuringiensis* | TWO.0 (Bayer) | 360 |
| Insecticides active on energy metabolism (respiration) | | |
| Chlorfenapyr | SERGEANT (Arysta) | |
| Insecticides with unknown or non-specific mode of action | | |
| Azadirachtin | Azatin (Certis) | |

*The amounts used are dose rates used in practise of the AI's on plant tissue or seeds via insecticide products.

4. Determination of Synergy

In some instances, the stimulation of the antifungal activity of natamycin by an insecticide was found to be synergistic. The Colby equation (Colby, 1967. Weeds 15: 20-22) calculates the expected antifungal activity (E in %) of a combination comprising more than one active ingredients:

$$E = X + Y - [(X \cdot Y)/100]$$

wherein X and Y are the observed antifungal activities (in %) of the individual active ingredients x and y, respectively. If the observed antifungal activity (O in %) of the combination exceeds the expected antifungal activity (E in %) of the combination and the synergy factor O/E is thus >1.0, the combined application of the active ingredients leads to a synergistic antifungal effect.

Example 1. Efficacy Testing of Insecticides on Fungicidal Action of Natamycin on Artificially Infected Plant Tissue Materials and methods Apple cv Elstar was from organic origin and SKAL certified. SKAL is a semi-governmental Dutch organization that controls organic production in the Netherlands.

A *Botrytis cinerea* spore-suspension containing ~$10^5$ propagules (spores)/ml is used.

Fruit peel is damaged with a cork borer with a diameter of 0.6 cm, depth ~0.5 cm into the fruit, 2 wounds per apple fruit. 30 microliter of a freshly prepared spore suspension of *B. cinerea* (~$10^5$ spores/ml) is applied by pipette onto each wound. Subsequently, the spore-suspension is allowed to air-dry for 3 hours. 50 microliters of natamycin and/or insecticide as indicated in Tables 4 and 5 below, are applied by pipette to each wound.

All fruits are kept at room temperature (20° C.). Wounds are examined daily and recorded after 10 days.

All treatments are performed on 6 individual apples with 2 wounds each resulting in 12 wounds per treatment. The recorded observed antifungal activity is the reduction (in percentages) of the average surface area of the rot as observed in the 12 wounds compared to the rot surface area of an untreated control.

Results

The results are presented in Tables 4 and 5. Individual letters indicate different infection rates (surface areas), whereby A is the highest infection area and B, C, D are decreasing infection area's (B is significantly lower than A, C is significantly lower than B and D is significantly lower than C). These results clearly show that insecticides do not have fungicidal activity by themselves but the insecticides of Table 4, who's mode of action is via the nerve or muscular system of insects, stimulate the fungicidal action of natamycin on apple plant tissue, while the insecticides of Table 5, who's mode of action is not via the nerve or muscular system of insects, do not.

TABLE 4

| Activating insecticides | | | | | |
|---|---|---|---|---|---|
| | | Natamycin concentration | | | |
| | Insecticide dose rate | 0 ppm | 50 ppm | 100 ppm | 200 ppm |
| Lambda-Cyhalothrin (IRAC group 3) | 0 | A | B | C | C |
| | See Table 3; 38 ppm | A | C | D | D |
| Alpha cypermetrin (IRAC group 3) | 0 | A | B | C | C |

TABLE 4-continued

Activating insecticides

| Insecticide | dose rate | Natamycin concentration | | | |
|---|---|---|---|---|---|
| | | 0 ppm | 50 ppm | 100 ppm | 200 ppm |
| Acetamiprid (IRAC group 4) | See Table 3; 100 ppm | A | C | D | D |
| | 0 | A | B | C | C |
| Abamectin (IRAC group 6) | See Table 3; 250 ppm | A | C | D | D |
| | 0 | A | B | C | C |
| Emamectin benzoate (IRAC group 6) | See Table 3; 18 ppm | A | C | D | D |
| | 0 | A | B | C | C |
| Flubendiamide (IRAC group 28) | Full label; 1.5 ppm | A | C | D | D |
| | 0 | A | B | C | C |
| | See Table 3; 500 ppm | A | C | D | D |

TABLE 5

Non-activating insecticides

| Insecticide | dose rate | Natamycin concentration | | | |
|---|---|---|---|---|---|
| | | 0 ppm | 50 ppm | 100 ppm | 200 ppm |
| Fenoxycarb (IRAC group 7) | 0 | A | B | C | C |
| | See Table 3; 100 ppm | A | B | C | C |
| Chlorfenapyr (IRAC group 13) | 0 | A | B | C | C |
| | See Table 3; 150 ppm | A | B | C | C |
| Bacillus thurengiensis (IRAC group 11) | 0 | A | B | C | C |
| | See Table 3; 360.000 ppm | A | B | C | C |
| Azadirachtin (unknown mode of action) | 0 | A | B | C | C |
| | See Table 3; 350 ppm | A | B | C | C |

Example 2. Efficacy Testing of Natamycin with and without Insecticides on Fungicidal Action on Pathogenic Fungi on Seeds in Artificially Infected Soil Materials and methods Seeds are coated with a natamycin formulation as described in Table 1, in the presence or absence of an insecticide composition as described in Table 2. Soybean seeds are placed in soil that is artificially infected (see below for method).

Soil infection is obtained via incubation of soil with infected, killed *Sorghum* seeds. For this, 100 g of *Sorghum* seeds and 100 ml water are put into a 500 ml bottle, which is autoclaved twice (121° C., 15 min, 15 psi). The dead *sorghum* seeds are infected with *Fusarium graminearum* segments (circular segments with a height on 5 mm of agar, full grown with fresh *Fusarium graminearum* mycelium, which are cut out of a petri dish with a cork borer with a diameter of 6 mm. Ten *F. graminearum* agar segments are placed, at 25° C., in the 500 ml bottle containing the 100 g autoclaved (dead) *Sorghum* seeds in 100 ml of water and incubated at 25° C. for two weeks (16 h day light, 8 hours dark). To prepare the infected soil, a soil (Lentse potgrond type 821201030, purchased from Horticoop) and sand (river sand of the company van Leusden in Wageningen) in a 1:1 mixture are placed in plug trays (the dimensions of the tray are 52 cm by 30 cm with 40 round cells having a diameter of 5 cm and a depth of 4.5 cm (Modiform; Leusden, the Netherlands).

Three infected *Sorghum* seeds, that act as a carrier for *F. graminearum*, are spread in each plug containing the sandy soil mixture. Trays are left in the greenhouse (16 h day light, 20° C. day and 18° C. night temperature, 60% humidity) for one week.

Hereafter, soybean seeds are rinsed with 70% ethanol and washed off thoroughly with water.

Natamycin (0.06, 0.12 or 0.24 g active ingredient per 1 kg of seeds) and the indicated insecticides (for dose rates see Table 3) are suspended or dissolved in 30 ml water to prepare user solutions. Next, 250 gram of seeds is put into a rotary coater and the user solutions are applied to the seeds. The seeds are rotated for 45 seconds with the respective solutions. The solutions are evenly spread over the seeds through the spinning disc of the rotary coater. Thereafter, the seeds are removed from the rotary coater and put into a dryer for 15 minutes at a temperature of 25° C.

Seeds are sown 2 cm deep into a cell (plug) of the plug tray containing the soil/sand mixture, 20 seeds per treatment, one seed per cell. Emergence of the seedlings and quality assessment of the seedlings are assessed 14 days after sowing.

Results

In Tables 6 and 7 the effect of natamycin with and without insecticides that are active on the nerve or muscular system of insects (Table 6) or on other systems of the insect (Table 7), on the quality of seed development of soybean seeds is shown. 14 days after sowing the percentage of healthy seedlings (compared to soybean seed development in non-infected soil), abnormal seedlings (e.g. stunted growth, small discolored plants, malformed leaves) and dead seeds is determined. Results in Tables 6 and 7 represent the percentage of healthy seedlings.

TABLE 6

Effect of natamycin combined with insecticides that are active on the nerve or muscular system of insects, on the quality of seed development of soybean seeds. Presented is the percentage of healthy seeds.

| Insecticide | Insecticide dose rate | Natamycin concentration | | | |
|---|---|---|---|---|---|
| | | 0 ppm | 50 ppm | 100 ppm | 200 ppm |
| Fipronil (IRAC group 2) | 0 | A | B | C | C |
| | See Table 3; 6250 ppm | A | C | D | D |
| Imidacloprid (IRAC group 4) | 0 | A | B | C | C |
| | See Table 3 7500 ppm | A | C | D | D |
| Chlorantraniliprole (IRAC group 28) | 0 | A | B | C | C |
| | See Table 3; 5000 ppm | A | C | D | D |

TABLE 7

Effect of natamycin combined with insecticides that are not active on the nerve or muscular system of insects, on the quality of seed development of soybean seeds. Presented is the percentage of healthy seeds.

| | | Natamycin concentration | | | |
|---|---|---|---|---|---|
| Insecticide | Insecticide dose rate | 0 ppm | 50 ppm | 100 ppm | 200 ppm |
| Fenoxycarb (IRAC group 7) | 0 | A | B | C | C |
| | See Table 3; 100 ppm | A | B | C | C |
| Chlorfenapyr (IRAC group 13) | 0 | A | B | C | C |
| | See Table 3; 150 ppm | A | B | C | C |
| Azadirachtin (unknown mode of action) | 0 | A | B | C | C |
| | See Table 3; 350 ppm | A | B | C | C |

Results

In Tables 6 and 7, the individual letters indicate different percentages of healthy seedlings, whereby A represents the lowest rate of healthy seedlings and B, C, D are increasing healthy seedling rates (B is significantly higher than A, C is significantly higher than B and D is significantly higher than C).

These results clearly show that insecticides do not have fungicidal by themselves but the insecticides of Table 6, who's mode of action is via the nerve or muscular system of insects, stimulate the fungicidal action of natamycin on seeds, while the insecticides of Table 7, who's mode of action is not via the nerve or muscular system of insects, do not.

Example 3. Effect of Natamycin and Insecticides Alone or Combined on Fungicidal Attack of Seeds of Corn

Materials and Methods

Dose rates of the insecticides are provided in Table 3. The method for treatment of corn seed is the same as that described for soybean seeds in Example 2. 14 days after sowing the percentage of healthy seedlings (comparable to corn seed development in non-infected soil), abnormal seedlings (eg stunted growth, small discolored plants, malformed leaves) and dead seeds is determined. Results in Table 8 represent the percentage of healthy seedlings.

In Table 8 the effect of natamycin combined with insecticides that are active on the nerve or muscular system of insects on the quality of seed development of corn seeds is presented.

TABLE 8

Effect of natamycin and insecticides of which the mode of action is via the nerve or muscular system alone on fungicidal attack of *Fusarium graminearum.*

| | | Natamycin concentration | | | |
|---|---|---|---|---|---|
| | Insecticide dose rate | 0 ppm | 50 ppm | 100 ppm | 200 ppm |
| Fipronil | 0 | A | B | C | C |
| | See Table 3; 6250 ppm | A | C | D | D |
| Imidacloprid | 0 | A | B | C | C |
| | See Table 3; 7500 ppm | A | C | D | D |
| Chlorantraniliprole | 0 | A | B | C | C |
| | See Table 3; 5000 ppm | A | C | D | D |

The results of Table 8 show that insecticides which act via the nerve or muscular tissue do not have fungicidal by themselves but they stimulate the fungicidal action of natamycin on corn seeds, resulting in more healthy seedlings.

In Table 9 the effect on the quality of seed development of corn seeds treated with natamycin combined with insecticides that are not active on the nerve or muscular system of insects is presented.

TABLE 9

Effect of natamycin and insecticides of which the mode of action is not via the nerve or muscular system alone on fungicidal attack of *Fusarium graminearum.*

| | | | Natamycin concentration | | |
|---|---|---|---|---|---|
| | Insecticide dose rate | 0 | 50 ppm | 100 ppm | 200 ppm |
| Fenoxycarb (IRAC group 7) | 0 | A | B | C | C |
| | See Table 3; 100 ppm | A | B | C | C |
| Chlorfenapyr (IRAC group 13) | 0 | A | B | C | C |
| | See Table 3; 150 ppm | A | B | C | C |
| *Bacillus thurengiensis* | 0 | A | B | C | C |
| | See Table 3; 360.000 ppm | A | B | C | C |
| Azadirachtin (unknown mode of action) | 0 | A | B | C | C |
| | See Table 3; 350 ppm | A | B | C | C |

The results of Table 9 show that insecticides that do not have a mode of action via the nerve or muscular system do not have fungicidal activity by themselves and do not stimulate the fungicidal action of natamycin on seeds.

Example 4. Effect of natamycin and abamectin (active on the nerve system of insects) alone and in combination on attack of different pathogenic fungi on corn seeds.

Materials and methods

The methods are as described for the seed experiments in Example 2. *Fusarium graminearum* is replaced by the pathogenic fungi mentioned in Table 10. The natamycin and insecticide compositions are provided in Tables 1 and 2.

TABLE 10

The effect of natamycin with and without Abamectin on different types of pathogenic fungi.

| | Incubations | | | |
|---|---|---|---|---|
| Pathogen | Control without abamectin and natamycin | Abamectin full label (18 ppm) | Natamycin 100 ppm | Abamectin full label + natamycin 100 ppm |
| Rhizoctonia | A | A | B | C |
| Fusarium culmorum | A | A | B | C |
| Trichoderma hazarum | A | A | B | C |
| Aspergillus sp | A | A | B | C |
| Botrytis sp | A | A | B | C |

Results

The results of Table 10 clearly show that the insecticide abamectin, of which the mode of action is via the nerve or muscular system does not have fungicidal by itself but stimulates the fungicidal action of natamycin against different fungal pathogens on seeds leading to more healthy seedlings.

Example 5. Effect of Natamycin and Imidacloprid (Active on the Nerve System of Insects), Alone or in Combination on Different Types of Seeds Materials and methods Different types of seeds were planted in artificially infected soil (*Fusarium culmorum*) as described in Example 2, except that 75 gram of sugar beet seed, 75 gram of turfgrass seed, and 25 gram of tomato seed was used. The % of healthy seedling plants is assessed after 14 days of incubation.

Results

The results of Table 11 clearly show that imidacloprid does not have fungicidal activity by itself but it stimulates the fungicidal action of natamycin on seeds of different plants leading to more healthy seedlings.

TABLE 11

Effect of natamycin with and without imidacloprid on the percentage of healthy seedlings of different types of seeds.

| | Incubation | | | |
|---|---|---|---|---|
| Seed type | Control without imidacloprid and natamycin | imidaclop rid full label | Natamycin 100 ppm | imidacloprid full label + natamycin 100 ppm |
| Corn | A | A | B | C |
| Soybean | A | A | B | C |
| Wheat | A | A | B | C |
| Sugar beet 75 | A | A | B | C |
| Turfgrass 75 | A | A | B | C |
| Sunflower | A | A | B | C |
| Rapeseed | A | A | B | C |
| Tomato 25 | A | A | B | C |

Example 6. The Effect of Fipronil on Natamycin Efficacy against *Fusarium culmorum*

Materials and Methods for Examples 6-19

Agar medium was prepared by mixing in a 100 ml Duran bottle 3.9 g of potato dextrose agar (PDA) from Carl-Roth (Carl-Roth GmbH+Co. KG, Karlsruhe, Germany) with 100 ml deionized water and autoclaving the Duran bottle at 120° C. for 15 minutes. After autoclaving, the solution was cooled by putting it in a 48° C. oven for about two hours. Afterward the semi-liquid PDA solution was carefully mixed with natamycin and/or insecticide dosages as specified in Table 12. The medium in the Duran bottle was divided over 5 petri dishes (90×15 mm), 20 ml per petri dish by using 25 ml serological pipets (ROTILABO®; Carl-Roth). Each natamycin and/or insecticide treatment was performed in five-fold.

Fungal spore suspensions were prepared by drenching a fully grown petri dish with sterile water. The fungus was scraped off and filtered through a Miracloth (pore size: 22-25 μm) (Merck KGaA, Darmstadt, Germany; catalogue number: 475855). The number of spores were counted with a hemocytometer and fungal suspension was adjusted to $10^6$ spores per ml. Afterward, 5 □l of prepared spore suspension was pipetted on the center of the agar plate. The plates were incubated at 25° C. Measurement of the fungal growth was done using calipers at different time points.

In this example the product REGENT® of BASF containing the active ingredient fipronil, belonging to IRAC Group 2 was used to test the synergy with natamycin. The insecticide concentration "N" (see below) that was used was 0.94 g insecticide product per 100 ml PDA agar. 0.5 N is 0.47 g. The concentration of natamycin in the natamycin containing incubations was 1 ppm. The ratio natamycin:fipronil were 1:7520 (w/w) and 1:3760 (w/w). The efficacy was assessed after 7 days of incubation in a stove at 25° C. Synergistic calculation was done using the Colby equation.

Results

TABLE 12

The effect of fipronil on natamycin efficacy against *Fusarium culmorum*.

| Treatment | Area mm2 | O % | E % | O/E | Interaction |
|---|---|---|---|---|---|
| blank | 2977.66 | 0.00 | | | |
| nata | 1865.54 | 37.35 | | | |
| fipronil 1N | 1437.02 | 51.74 | | | |
| fipronil 0.5N | 1742.33 | 41.49 | | | |
| nata + fipronil 1N | 529.80 | 82.21 | 69.76 | 1.18 | Synergistic |
| nata + fipronil 0.5N | 381.43 | 87.19 | 63.34 | 1.38 | Synergistic |

Example 7. The Effects of Lambda-Cyhalothrin on Natamycin Efficacy Against *Fusarium culmorum*

Materials and methods

See Example 6. In this example the product KARATE ZEON® of Syngenta containing the active ingredient lambda-cyhalothrin belonging to IRAC Group 3 was used.

The insecticide concentration "N" (see below) that was used was 20 μl insecticide product per 100 ml PDA agar. 0.5 N is 10 μl per 100 ml PDA agar.

The concentration of natamycin in the natamycin containing incubations was 1 ppm. The ratio's natamycin:lambda-cyhalothrin were 1:50 (w/w) and 1:25 (w/w). The efficacy was assessed after 7 days of incubation in a stove at 25° C.

Results

TABLE 13

Effects of lambda-cyhalothrin on natamycin efficacy against *Fusarium culmorum*.

| Treatment | Area mm2 | O % | E % | O/E | Interaction |
|---|---|---|---|---|---|
| blank | 2977.66 | 0.00 | | | |
| nata | 1865.54 | 37.35 | | | |
| cyhalothrin 1N | 2702.22 | 9.25 | | | |
| cyhalothrin 0.5N | 2546.95 | 14.46 | | | |
| nata + cyhalothrin 1N | 1108.92 | 62.76 | 43.14 | 1.45 | Synergistic |
| nata + cyhalothrin 0.5N | 1077.66 | 63.81 | 46.41 | 1.37 | Synergistic |

Example 8. The Effects of Lambda-Cyhalothrin on Natamycin Efficacy Against *Alternaria solani*

Materials and methods

See Example 6. In this example the product KARATE ZEON® of Syngenta containing the active ingredient lambda-cyhalothrin belonging to IRAC Group 3 was used.

The insecticide concentration "N" (see below) that was used was 500 µl of a 25 times in water diluted insecticide solution per 100 ml PDA agar. 2N is 1000 µl of the in water diluted solution per 100 ml PDA agar. 5N was 100 µl of the undiluted Karate zeon product in 100 ml of PDA agar.

The concentration of natamycin in the natamycin containing incubations was 0.5 ppm. The ratio's natamycin:lambda-cyhalothrin were 1:100 (w/w), 1:200 (w/w), and 1:500 (w/w). The efficacy was assessed after 4 days of incubation in a stove at 25° C.

Results

TABLE 14

Effects of lambda-cyhalothrin on natamycin efficacy against *Alternaria solani*.

| Treatment | Area mm2 | O % | E % | O/E | Interaction |
|---|---|---|---|---|---|
| Blank | 1632.81 | 0.00 | | | |
| Nata | 722.91 | 55.73 | | | |
| Lambda-cyhalothrin 1N | 1109.53 | 32.05 | | | |
| Lambda-cyhalothrin 2N | 871.89 | 46.60 | | | |
| Lambda-cyhalothrin 5N | 722.71 | 55.74 | | | |
| Lambda-cyhalothrin 1N + Nata | 467.37 | 71.38 | 69.91 | 1.02 | Synergistic |
| Lambda-cyhalothrin 2N + Nata | 365.15 | 77.64 | 76.36 | 1.02 | Synergistic |
| Lambda-cyhalothrin 5N + Nata | 265.18 | 83.76 | 80.40 | 1.04 | Synergistic |

Example 9. The Effects of Lambda-Cyhalothrin on Natamycin Efficacy Against *Sclerotinia sclerotiorum*

Materials and methods

See Example 6. In this example the product KARATE ZEON® of Syngenta containing the active ingredient lambda-cyhalothrin belonging to IRAC Group 3 was used.

The insecticide concentration "N" (see below) that was used was 500 µl of a 25 times in water diluted insecticide solution per 100 ml PDA agar. 2N is 1000 µl of the in water diluted solution per 100 ml PDA agar. 5N was 100 µl of the undiluted product in 100 ml of PDA agar.

The concentration of natamycin in the natamycin containing incubations was 0.5 ppm. The ratio's natamycin:lambda-cyhalothrin were 1:100 (w/w), 1:200 (w/w), and 1:500 (w/w). The efficacy was assessed after 4 days of incubation in a stove at 25° C.

Results

TABLE 15

Effects of lambda-cyhalothrin on natamycin efficacy against *Sclerotinia sclerotiorum*.

| Treatment | Area mm2 | O % | E % | O/E | Interaction |
|---|---|---|---|---|---|
| blank | 1957.34 | 0.00 | | | |
| nata | 1084.35 | 44.60 | | | |
| cyhalothrin 1N | 1672.70 | 14.54 | | | |
| cyhalothrin 2N | 1620.50 | 17.21 | | | |
| cyhalothrin 5N | 1528.98 | 21.89 | | | |
| cyhalothrin 1N + nata | 638.92 | 67.36 | 52.66 | 1.28 | Synergistic |
| cyhalothrin 2N + nata | 326.98 | 83.29 | 54.13 | 1.54 | Synergistic |
| cyhalothrin 5N + nata | 301.77 | 84.58 | 56.72 | 1.49 | Synergistic |

Example 10. The Effects of Lambda-Cyhalothrin on Natamycin Efficacy against *Botrytis cinerea*

Materials and methods

See Example 6. In this example the product KARATE ZEON® of Syngenta containing the active ingredient lambda-cyhalothrin belonging to IRAC Group 3 was used.

The insecticide concentration "N" (see below) that was used was 20 µl of insecticide product per 100 ml PDA agar. 0.5N is 10 µl of the product per 100 ml PDA agar. 0.25N was 5 µl of the undiluted Karate zeon product in 100 ml of PDA agar and 0.125N was 2.5 µl of the insecticide product per 100 ml PDA agar.

The concentration of natamycin in the natamycin containing incubations was 1 ppm. The ratio's natamycin:lambda-cyhalothrin were 1:12.5 (w/w). 1:25 (w/w) and 1:50 (w/w). The efficacy was assessed after 6 days of incubation in a stove at 25° C.

Results

TABLE 16

Effects of lambda-cyhalothrin on natamycin efficacy against *Botrytis cinerea*.

| Treatment | Area mm2 | O % | E % | O/E | Interaction |
|---|---|---|---|---|---|
| blank | 3251.01 | 0.00 | | | |
| natamycin (Nata) | 2361.79 | 27.35 | | | |
| cyhalothrin 1N | 3295.33 | −1.36 | | | |
| cyhalothrin 0.5N | 3366.17 | −3.54 | | | |
| cyhalothrin 0.25N | 3544.50 | −9.03 | | | |
| Nata + cyhalothrin 1N | 914.08 | 71.88 | 26.36 | 2.73 | Synergistic |
| Nata + cyhalothrin 0.5N | 899.02 | 72.35 | 24.78 | 2.92 | Synergistic |
| Nata + cyhalothrin 0.25N | 2188.53 | 32.68 | 20.79 | 1.57 | Synergistic |

Example 11. The Effects of Imidacloprid on Natamycin Efficacy against *Fusarium graminerum*

Materials and Methods

See Example 6. In this example the active insecticide ingredient imidacloprid belonging to IRAC Group 4 was formulated with the additional compounds as indicated in Table 17.

TABLE 17

Formulation of imidacloprid.

| Substance | [%] |
|---|---|
| Imidacloprid | 39.9 |
| Atlox 4913 | 2.2 |
| Atlox 4894 | 2.2 |
| Antifoam | 0.1 |
| Biocide | 0.2 |
| water | 50.0 |
| XG | 0.4 |
| Propylene glycol | 5.2 |
| Total | 100 |

The insecticide concentration "N" (see below) that was used was 5 μl of insecticide formulation per 100 ml PDA agar. 0.5N is 2.5 μl of the product per 100 ml PDA agar. The concentration of natamycin in the natamycin containing incubations was 1 ppm. The ratio's natamycin:imidacloprid were 1:20 (w/w) and 1:10 (w/w). The efficacy was assessed after 8 and 12 days of incubation in a stove at 25° C.

Results

TABLE 18

Effects of imidacloprid on natamycin efficacy after 8 days against *Fusarium graminerum*.

| Treatment | Area mm2 | O % | E % | O/E | Interaction |
|---|---|---|---|---|---|
| blank | 3263.44 | 0.00 | | | |
| nata | 2225.44 | 31.81 | | | |
| imidacloprid 1N | 4635.62 | −42.05 | | | |
| imidacloprid 0.5N | 2779.54 | 14.83 | | | |
| nata + imidacloprid 1N | 2198.67 | 32.63 | 3.13 | 10.41 | Synergistic |
| nata + imidacloprid 0.5N | 1847.38 | 43.39 | 41.92 | 1.04 | Synergistic |

TABLE 19

Effects of imidacloprid on natamycin efficacy after 12 days against *Fusarium graminerum*.

| Treatment | Area mm2 | O % | E % | O/E | Interaction |
|---|---|---|---|---|---|
| blank | 4852.57 | 0.00 | | | |
| nata | 3962.08 | 18.35 | | | |
| imidacloprid 1N | 5273.80 | −8.68 | | | |
| imidacloprid 0.5N | 4606.42 | 5.07 | | | |
| nata + imidacloprid 1N | 3849.55 | 20.67 | 11.26 | 1.84 | Synergistic |
| nata + imidacloprid 0.5N | 3408.44 | 29.76 | 22.49 | 1.32 | Synergistic |

Example 12. The Effects of Thiamethoxam on Natamycin Efficacy against *Fusarium culmorum*

Materials and methods

See Example 6. In this example the active ingredient thiamethoxam belonging to IRAC Group 4 was mixed with water to make a 1000 ppm solution. The insecticide concentration "N" (see below) that was used was 5 ml of insecticide solution per 100 ml PDA agar. 2N is 10 ml of the thiamethoxam solution per 100 ml PDA agar.

The concentration of natamycin in the natamycin containing incubations was 0.5 pm. The ratio's natamycin: thiamethoxam were 1:100 (w/w) and 1:200 (w/w). The efficacy was assessed after 4 days of incubation in a stove at 25° C.

Results

TABLE 20

Effects of thiamethoxam on natamycin efficacy against *Fusarium culmorum*.

| Treatment | Area mm2 | O % | E % | O/E | Interaction |
|---|---|---|---|---|---|
| blank | 935.83 | 0.00 | | | |
| nata | 789.92 | 15.59 | | | |
| thiamethoxam 1N | 897.35 | 4.11 | | | |
| thiamethoxam 0.5N | 875.68 | 6.43 | | | |
| nata + thiamethoxam 1N | 657.81 | 29.71 | 19.06 | 1.56 | Synergistic |
| nata + thiamethoxam 0.5N | 677.09 | 27.65 | 21.02 | 1.32 | Synergistic |

Example 13. The Effects of Abamectin on Natamycin Efficacy against *Fusarium graminerum*

Materials and methods

See Example 6. In this example the product VERTIMEC® (Syngenta) containing the active ingredient abamectin belonging to IRAC Group 6 was used.

The insecticide concentration "N" (see below) that was used was 75 μl of insecticide product per 100 ml PDA agar. 0.5N is 37.5 μl of the product per 100 ml PDA agar.

The concentration of natamycin in the natamycin containing incubations was 1 ppm. The ratio's natamycin: abamectin were 1:13.5 (w/w) and 1:6.75 (w/w). The efficacy was assessed after 8 and 12 days of incubation in a stove at 25° C.

Results

TABLE 21

Effects of abamectin on natamycin efficacy after 8 days against *Fusarium culmorum*.

| Treatment | Area mm2 | O % | E % | O/E | Interaction |
|---|---|---|---|---|---|
| blank | 3263.44 | 0.00 | | | |
| nata | 2225.44 | 31.81 | | | |
| abamectin 1N | 2475.61 | 24.14 | | | |
| abamectin 0.5N | 2881.30 | 11.71 | | | |
| nata + abamectin 1N | 889.12 | 72.76 | 48.27 | 1.51 | Synergistic |
| nata + abamectin 0.5N | 1399.83 | 57.11 | 39.79 | 1.44 | Synergistic |

TABLE 22

Effects of abamectin on natamycin efficacy after 12 days against *Fusarium culmorum*.

| Treatment | Area mm2 | O % | E % | O/E | Interaction |
|---|---|---|---|---|---|
| blank | 4852.57 | 0.00 | | | |
| nata | 3962.08 | 18.35 | | | |
| abamectin 1N | 3944.95 | 18.70 | | | |
| abamectin 0.5N | 4282.74 | 11.74 | | | |
| nata + abamectin 1N | 2635.97 | 45.68 | 33.62 | 1.36 | Synergistic |
| nata + abamectin 0.5N | 3383.67 | 30.27 | 27.94 | 1.08 | Synergistic |

Example 14. The Effects of Abamectin on Natamycin Efficacy against *Fusarium graminerum*

Materials and Methods

See Example 6. In this example the product VERTIMEC® (Syngenta) containing the active ingredient abamectin belonging to IRAC Group 6 was used. The insecticide concentration "N" (see below) that was used was 75 µl of insecticide product per 100 ml PDA agar. 0.5N is 37.5 µl of the product per 100 ml PDA agar.

The concentration of natamycin in the natamycin containing incubations was 1 ppm. The ratio's natamycin:abamectin were 1:13.5 (w/w) and 1:6.75 (w/w). The efficacy was assessed after 7 days of incubation in a stove at 25° C.

Results

TABLE 23

Effects of abamectin on natamycin efficacy against *Fusarium culmorum*.

| Treatment | Area mm2 | O % | E % | O/E | Interaction |
|---|---|---|---|---|---|
| blank | 2977.66 | 0.00 | | | |
| nata | 1865.54 | 37.35 | | | |
| abamectin 1N | 453.27 | 84.78 | | | |
| abamectin 0.5N | 764.44 | 74.33 | | | |
| nata + abamectin 1N | 145.33 | 95.12 | 90.46 | 1.05 | Synergistic |
| nata + abamectin 0.5N | 277.63 | 90.68 | 83.92 | 1.08 | Synergistic |

Example 15. The Effects of Chlorantraniliprole on Natamycin Efficacy against *Botrytis cinerea*

Materials and Methods

See Example 6. In this example the product CORAGEN® of Dupont containing the active ingredient chlorantraniliprole belonging to IRAC Group 28 was used.

The insecticide concentration "N" (see below) that was used was 125 µl of insecticide product per 100 ml PDA agar. Per 100 ml PDA agar the concentration 0.25N contained 31.25 µl coragen; 0.5N contained 62.5 µl coragen, 2N contained 250 µl coragen, 5N contained 625 µl coragen and 10N contained 1250 µl of the coragen product per 100 ml PDA agar.

The concentration of natamycin in the natamycin containing incubations was 1 ppm. The ratio's natamycin:chlorantraniliprole were 1:62.5 (w/w), 1:125 (w/w), 1:250 (w/w), 1:500 (w/w), 1:1250 (w/w) and 1:2500 (w/w). The efficacy was assessed after 4 and 5 days of incubation in a stove at 25° C.

TABLE 24

Effects of chlorantraniliprole on natamycin efficacy after 4 days against *Botrytis cinerea*.

| Treatment | Area mm2 | O % | E % | O/E | Interaction |
|---|---|---|---|---|---|
| blank | 2521.56 | 0.00 | | | |
| nata | 1456.89 | 42.22 | | | |
| chlorantraniliprole 0.25N | 2762.05 | −9.54 | | | |
| chlorantraniliprole 0.5N | 2841.26 | −12.68 | | | |
| chlorantraniliprole 1N | 2897.46 | −14.91 | | | |
| chlorantraniliprole 2N | 2599.18 | −3.08 | | | |
| chlorantraniliprole 5N | 1270.26 | 49.62 | | | |
| chlorantraniliprole 10N | 344.05 | 86.36 | | | |
| nata + chlorantraniliprole 0.25N | 1105.40 | 56.16 | 36.71 | 1.53 | Synergistic |
| nata + chlorantraniliprole 0.5N | 1020.49 | 59.53 | 34.90 | 1.71 | Synergistic |
| nata + chlorantraniliprole 1N | 1153.50 | 54.25 | 33.61 | 1.61 | Synergistic |
| nata + chlorantraniliprole 2N | 1396.45 | 44.62 | 40.44 | 1.10 | Synergistic |
| nata + chlorantraniliprole 5N | 665.61 | 73.60 | 70.89 | 1.04 | Synergistic |
| nata + chlorantraniliprole 10N | 101.46 | 95.98 | 92.12 | 1.04 | Synergistic |

TABLE 25

Effects of chlorantraniliprole on natamycin efficacy after 5 days against *Botrytis cinerea*.

| Treatment | Area mm2 | O % | E % | O/E | Interaction |
|---|---|---|---|---|---|
| blank | 4267.24 | 0.00 | | | |
| nata | 3089.49 | 27.60 | | | |
| chlorantraniliprole 0.25N | 4357.23 | −2.11 | | | |
| chlorantraniliprole 0.5N | 4549.21 | −6.61 | | | |
| chlorantraniliprole 1N | 4370.03 | −2.41 | | | |
| chlorantraniliprole 2N | 4341.96 | −1.75 | | | |
| chlorantraniliprole 5N | 2747.54 | 35.61 | | | |
| chlorantraniliprole 10N | 705.44 | 83.47 | | | |
| nata + chlorantraniliprole 0.25N | 2874.34 | 32.64 | 26.07 | 1.25 | Synergistic |
| nata + chlorantraniliprole 0.5N | 2509.38 | 41.19 | 22.82 | 1.81 | Synergistic |
| nata + chlorantraniliprole 1N | 2748.41 | 35.59 | 25.86 | 1.38 | Synergistic |
| nata + chlorantraniliprole 2N | 3008.15 | 29.51 | 26.33 | 1.12 | Synergistic |
| nata + chlorantraniliprole 5N | 1494.69 | 64.97 | 53.38 | 1.22 | Synergistic |
| nata + chlorantraniliprole 10N | 289.57 | 93.21 | 88.03 | 1.06 | Synergistic |

Example 16. The Effects of Hydropene on Natamycin Efficacy against *Botrytis cinerea*

Materials and Methods

See Example 6. In this example the product GENTROL® IGR (Zoecon; Syngenta) containing the active ingredient hydroprene belonging to IRAC Group 7 was used.

The insecticide concentration "N" (see below) that was used was 300 μl of a solution of 2.49 ml Gentrol in 50 ml of water added to 50 ml PDA agar. 0.5N: 150 μl and 0.25N: 75 μl of the insecticide solution insecticide product per 100 ml PDA agar.

The concentration of natamycin in the natamycin containing incubations was 1 ppm. The ratio's natamycin: hydroprene were 1:3.4 (w/w), 1:6.75 (w/w), and 1:13.5 (w/w). The efficacy was assessed after 4 days of incubation in a stove at 25° C.

Results

TABLE 26

Effects of hydropene on natamycin efficacy against *Botrytis cinerea*.

| Treatment | Area mm2 | O % | E % | O/E | Interaction |
|---|---|---|---|---|---|
| blank | 2931.10 | 0.00 | | | |
| nata | 11.51 | 99.61 | | | |
| hydropene 0.25N | 287.31 | 90.20 | | | |
| hydropene 0.5N | 270.12 | 90.78 | | | |
| hydropene 1N | 251.05 | 91.43 | | | |
| nata + hydropene 0.25N | 16.19 | 99.45 | 99.96 | 0.99 | No synergism |
| nata + hydropene 0.5N | 19.63 | 99.33 | 99.96 | 0.99 | No synergism |
| nata + hydropene 1N | 13.59 | 99.54 | 99.97 | 1.00 | — |

Example 17. The Effects of Hydropene on Natamycin Efficacy against *Fusarium culmorum*

Materials and Methods

See Example 6. In this example the product GENTROL® IGR (Zoecon; Syngenta) containing the active ingredient hydroprene was used.

The insecticide concentration "N" (see below) that was used was 300 μl of a solution of 2.49 ml Gentrol in 50 ml of water added to 50 ml PDA agar. 0.5N: 150 μl and 0.25N: 75 μl of the insecticide solution insecticide product per 100 ml PDA agar.

The concentration of natamycin in the natamycin containing incubations was 1 ppm. The ratio's natamycin: hydroprene were 1:3.4 (w/w), 1:6.75 (w/w) and 1:13.5 (w/w). The efficacy was assessed after 5 days of incubation in a stove at 25° C.

Results

TABLE 27

Effects of hydropene on natamycin efficacy against *Fusarium culmorum*.

| Treatment | Area mm2 | O % | E % | O/E | Interaction |
|---|---|---|---|---|---|
| blank | 853.29 | 0.00 | | | |
| nata | 811.66 | 4.88 | | | |
| hydropene 0.25N | 410.28 | 51.92 | | | |
| hydropene 0.5N | 371.59 | 56.45 | | | |
| hydropene 1N | 291.67 | 65.82 | | | |
| nata + hydropene 0.25N | 463.37 | 45.70 | 54.26 | 0.84 | No synergism |
| nata + hydropene 0.5N | 369.31 | 56.72 | 58.58 | 0.97 | No synergism |
| nata + hydropene 1N | 342.58 | 59.85 | 67.49 | 0.89 | No synergism |

Example 18. The Effects of Hydropene on Natamycin Efficacy against *Fusarium graminerum*

Materials and Methods

See Example 6. In this example the product GENTROL® IGR (Zoecon; Syngenta) containing the active ingredient hydroprene belonging to IRAC Group 7 was used.

The insecticide concentration "N" (see below) that was used was 300 μl of a solution of 2.49 ml Gentrol in 50 ml of water added to 50 ml PDA agar. 0.5N: 150 μl and 0.25N: 75 μl of the insecticide solution insecticide product per 100 ml PDA agar.

The concentration of natamycin in the natamycin containing incubations was 1 ppm. The ratio's natamycin: hydroprene were 1:3.4 (w/w), 1:6.75 (w/w) and 1:13.5 (w/w). The efficacy was assessed after 5 days of incubation in a stove at 25° C.

Results

TABLE 28

Effects of hydropene on natamycin efficacy against *Fusarium graminerum*.

| Treatment | Area mm2 | O % | E % | O/E | Interaction |
|---|---|---|---|---|---|
| blank | 2671.90 | 0.00 | | | |
| nata | 1294.81 | 51.54 | | | |
| hydropene 0.25N | 644.65 | 75.87 | | | |
| hydropene 0.5N | 434.19 | 83.75 | | | |
| hydropene 1N | 301.52 | 88.72 | | | |
| nata + hydropene 0.25N | 436.98 | 83.65 | 88.31 | 0.95 | No synergism |
| nata + hydropene 0.5N | 244.54 | 90.85 | 92.13 | 0.99 | No synergism |
| nata + hydropene 1N | 139.06 | 94.80 | 94.53 | 1.00 | No synergism |

Example 19. The Effects of *Bacillus thuringiensis* on Natamycin Efficacy against *Fusarium graminerum*

Materials and Methods

See Example 6. In this example the product XENTARI® (Bayer) containing the active ingredient *Bacillus thuringiensis* (15.000 IU/mg (IU=International Unit)) belonging to IRAC Group 11 was used.

The insecticide concentration "N" (see below) that was used was 31.25 mg of Xentari product added to 100 ml PDA agar. 0.5N: 15.63 mg Xentari added to 100 ml PDA agar.

The concentration of natamycin in the natamycin containing incubations was 1 ppm. The ratio's natamycin: *Bacillus thuringiensis* were 1:156.25 and 1:312.5 (w/w on product basis of Xentari). The efficacy was assessed after 8 days of incubation in a stove at 25° C.

Results

TABLE 29

Effects of *Bacillus thuringiensis* on natamycin efficacy against *Fusarium graminerum*.

| Treatment | Area mm2 | O % | E % | O/E | Interaction |
|---|---|---|---|---|---|
| blank | 3263.44 | 0.00 | | | |
| nata | 2225.44 | 31.81 | | | |
| *B. thuringiensis* 1N | 3502.39 | −7.32 | | | |
| *B. thuringiensis* 0.5N | 1653.92 | 49.32 | | | |
| nata + *B. thuringiensis* 1N | 2395.34 | 26.60 | 26.81 | 0.99 | No synergism |
| nata + *B. thuringiensis* 0.5N | 2528.66 | 22.52 | 65.44 | 0.34 | No synergism |

Example 20. the Effects of Chlorfenapyr on Natamycin Efficacy Against *Fusarium culmorum*

Materials and methods

See Example 6. In this example the product SPECTRE® (Adama) containing the active ingredient chlorfenapyr belonging to IRAC Group 13 was used.

The insecticide concentration "N" (see below) that was used was 1 ml of Spectre product added to 100 ml PDA agar. 0.5N: 0.5 ml and 0.25N is 0.25 ml Spectre per 100 ml of PDA agar.

The concentration of natamycin in the natamycin containing incubations was 1 ppm. The ratio's natamycin: chlorfenapyr were 1:536 (w/w), 1:1072 (w/w) and 1:2145 (w/w). The efficacy was assessed after 7 days of incubation in a stove at 25° C.

Results

TABLE 30

Effects of chlorfenapyr on natamycin efficacy against *Fusarium culmorum*.

| Treatment | Area mm2 | O % | E % | O/E | Interaction |
|---|---|---|---|---|---|
| blank | 2570.77 | 0.00 | | | |
| nata | 1840.10 | 28.42 | | | |
| chlorfenapyr 0.25N | 1040.80 | 59.51 | | | |
| chlorfenapyr 0.5N | 644.86 | 74.92 | | | |
| chlorfenapyr 1N | 228.67 | 91.11 | | | |
| nata + chlorfenapyr 0.25N | 797.20 | 68.99 | 71.02 | 0.97 | No synergism |
| nata + chlorfenapyr 0.5N | 474.11 | 81.56 | 82.05 | 0.99 | No synergism |
| nata + chlorfenapyr 1N | 302.92 | 88.22 | 93.63 | 0.94 | No synergism |

Example 21. The Effects of Azadirachtin on Natamycin Efficacy Against *Fusarium graminerum*

Materials and methods

See Example 6. In this example the product AZATIN® (Certis) containing the active ingredient azadirachtin (containing 217 g/L azadirachtin (formulated to achieve a concentration of 26 g/L azadirachtin-A) belonging to an yet unknown IRAC Group was used.

The insecticide concentration "N" (see below) that was used was 31 µl of Azatin product added to 100 ml PDA agar. 0.5N: 37.5 µl of Azatin was added to 100 ml of PDA agar.

The concentration of natamycin in the natamycin containing incubations was 1 ppm. The ratio's natamycin: azadirachtin were on basis of azadirachtin-A, 1:9.75 (w/w) and 1:19.5 (w/w). The efficacy was assessed after 8 days of incubation in a stove at 25° C.

Results

TABLE 31

Effects of azadirachtin on natamycin efficacy against *Fusarium graminerum*.

| Treatment | Area mm2 | O % | E % | O/E | Interaction |
|---|---|---|---|---|---|
| blank | 3263.44 | 0.00 | | | |
| nata | 2225.44 | 31.81 | | | |
| azadirachtin 1N | 3303.19 | −1.22 | | | |
| azadirachtin 0.5N | 2262.22 | 30.68 | | | |
| nata + azadirachtin 1N | 2323.71 | 28.80 | 30.98 | 0.93 | No synergism |
| nata + azadirachtin 0.5N | 1630.22 | 50.05 | 52.73 | 0.95 | No synergism |

Example 22. The Effects of Emamectin Benzoate on Natamycin Efficacy Against *Fusarium graminerum*

Materials and Methods

See Example 6. In this example the product OPTIGARD® Cockroach Gel Bait, (Syngenta), containing the active ingredient emamectin benzoate belonging to IRAC Group 6 was used. The insecticide concentration "N" (see below) that was used was 250 mg of insecticide product per 100 ml PDA agar. 0.5N is 125 mg of the product per 100 ml PDA agar. The concentration of natamycin in the natamycin containing incubations was 0.25 ppm. The ratios natamycin: emamectin benzoate were 1:10 and 1:5 (w/w). The efficacy was assessed after 3 days of incubation in a stove at 25° C.

Results

TABLE 32

Effects of emamectin benzoate on natamycin efficacy against *Fusarium graminerum*.

| Treatment | Area mm2 | O % | E % | O/E | Interaction |
|---|---|---|---|---|---|
| blank | 493.40 | 0.00 | | | |
| nata | 484.32 | 1.84 | | | |
| emamectin benzoate 1N | 486.54 | 1.39 | | | |
| emamectin benzoate 0.5N | 329.33 | 33.25 | | | |
| nata + emamectin benzoate 1N | 463.21 | 6.12 | 3.21 | 1.91 | Synergism |
| nata + emamectin benzoate 0.5N | 288.08 | 41.61 | 34.48 | 1.21 | Synergism |

The invention claimed is:

1. An antifungal composition comprising natamycin and at least one insecticide that interferes with the nervous system and/or muscular system of insects and nematodes, wherein the volume-based average particle size of natamycin is between 0.2 and 10 micrometers, wherein said at least one insecticide is selected from the group consisting of emamectin benzoate, fipronil, lambda-cyhalothrin, imidacloprid, thiamethoxam, abamectin and chlorantraniliprole, and wherein the ratio of natamycin to the at least one insecticide is between 1:1 and 1:2500 (w/w).

2. The antifungal composition according to claim 1, comprising 6% to 60% (w/w) of natamycin and 5 to 50% (w/w) of said at least one insecticide.

3. The antifungal composition according to claim 1, further comprising an agriculturally acceptable carrier.

4. The antifungal composition according to claim 1, which is an aqueous or oily composition.

5. The composition according to claim 1, wherein the natamycin is milled to an average particle size of between 0.5 and 3 micrometer.

6. The composition according to claim 1, further comprising an insoluble polyelectrolyte complex of a polyanion and a polycation in relative amounts of between 1:2 and 60:1 (w/w).

7. A method for protecting an agricultural plant or plant part, comprising applying a composition according to claim 1 to said agricultural plant or plant part.

8. The method according to claim 7, wherein said plant part is a seed, bulb, fruit or vegetable.

9. A method for improving the development and/or yield of an agricultural plant, comprising contacting the plant with the composition according to claim 1.

10. A method for protecting a soil and/or a growth substrate, the method comprising applying the composition according to claim 1 to said soil and/or a growth substrate.

11. The method according to claim 10, wherein the growth substrate is a mushroom growth substrate.

12. The method according to claim 8, wherein said composition is undiluted or diluted in an aqueous solution or in oil, prior to applying the composition to a plant, plant part, soil and/or growth substrate.

13. A method of protecting a plant against fungi, the method comprising applying the composition according to claim 1 to the plant, a part of the plant, soil in which the plant is growing, and/or a growth substrate on which the plant is growing.

14. The composition according to claim 6, wherein the polyanion is a lignin compound and the polycation is chitosan or poly-allylamine.

15. The method according to claim 8, wherein the plant part is seed.

* * * * *